(12) United States Patent
Desrochers

(10) Patent No.: US 8,780,513 B2
(45) Date of Patent: Jul. 15, 2014

(54) REVERSE BATTERY CUTOFF CIRCUIT FOR AN ACTUATOR OR THE LIKE

(75) Inventor: Kristopher L. Desrochers, Ayr (CA)

(73) Assignee: CTS Corporation, Elkhart, IN (US)

( * ) Notice: Subject to any disclaimer, the term of this patent is extended or adjusted under 35 U.S.C. 154(b) by 466 days.

(21) Appl. No.: 13/013,430

(22) Filed: Jan. 25, 2011

(65) Prior Publication Data

US 2011/0188164 A1 Aug. 4, 2011

Related U.S. Application Data

(60) Provisional application No. 61/301,263, filed on Feb. 4, 2010.

(51) Int. Cl.
*H02H 3/00* (2006.01)

(52) U.S. Cl.
USPC ............................................. 361/82

(58) Field of Classification Search
USPC ............................... 361/82, 84, 88
See application file for complete search history.

(56) References Cited

U.S. PATENT DOCUMENTS 7,126,801 B2 * 10/2006 Jokinen .......................... 361/85

* cited by examiner

*Primary Examiner* — Rexford Barnie
*Assistant Examiner* — Christopher Clark
(74) *Attorney, Agent, or Firm* — Daniel J. Deneufbourg

(57) ABSTRACT

A reverse battery protection circuit for an actuator or the like. The circuit includes at least a first transistor and a second transistor which is coupled to both the first transistor and a voltage supply in a manner wherein the second transistor is adapted to turn the first transistor off in the event of an interruption in the voltage supply.

2 Claims, 1 Drawing Sheet

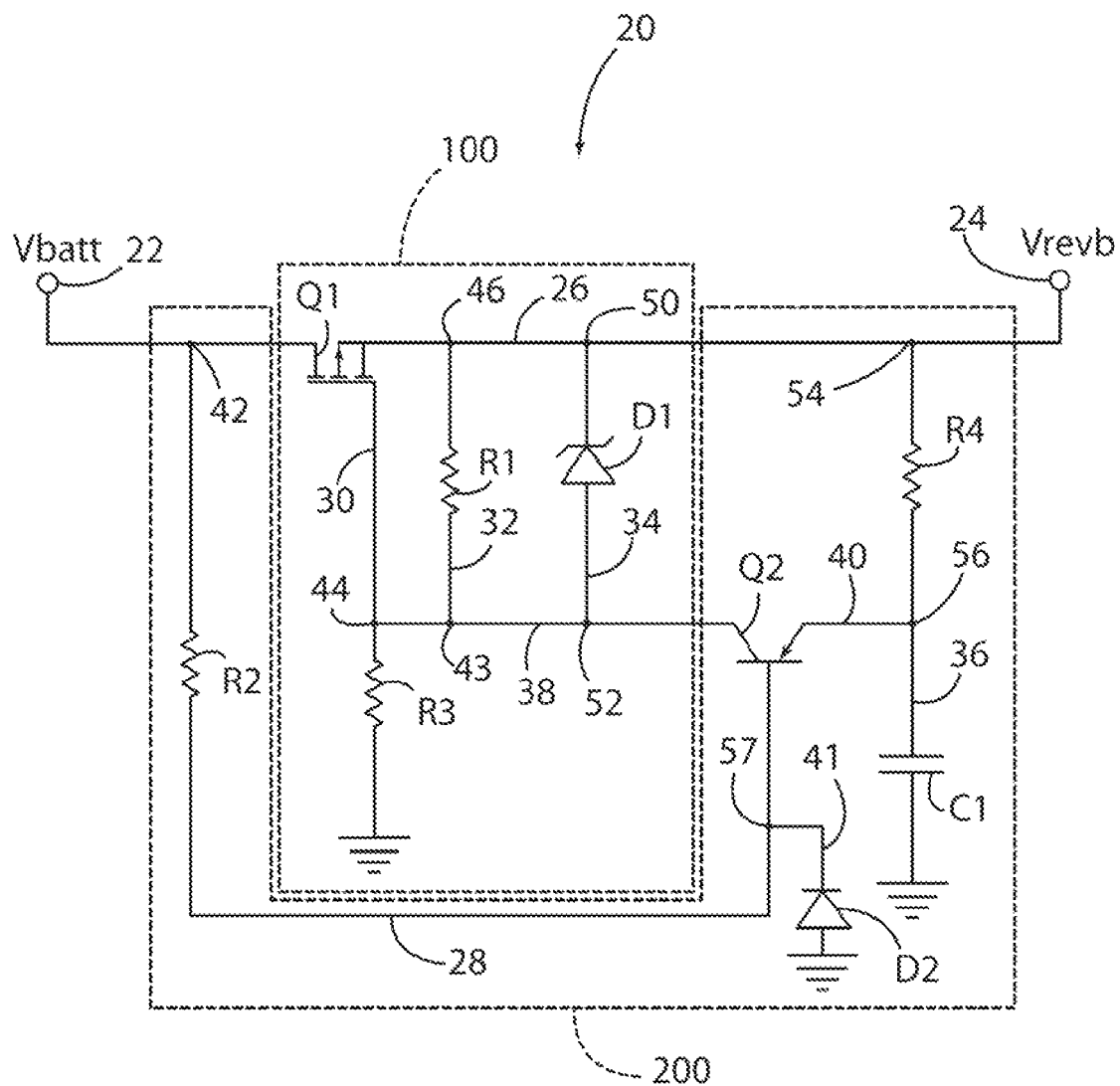

REVERSE BATTERY CUTOFF CIRCUIT FOR AN ACTUATOR OR THE LIKE

CROSS-REFERENCE TO RELATED APPLICATION

This application claims the benefit of the filing date and disclosure of U.S. Provisional Application Ser. No. 61/301,263 filed on Feb. 4, 2010 which is explicitly incorporated herein by reference as are all references cited therein.

FIELD OF THE INVENTION

This invention relates generally to electrical circuits and, more specifically, to a reverse battery cutoff circuit for a vehicle actuator or the like.

BACKGROUND OF THE INVENTION

Reverse battery protection is a critical part of the automotive circuitry and electronics which must be protected from, for example, the accidental connection of the vehicle battery in the wrong polarity, as this would destroy most semiconductor chips used in the vehicle including, for example, the chips used in actuators.

Reverse battery protection in low current application circuits generally involves the use of a diode which allows current to flow in only one direction. The use of a diode has the benefit of not only protecting a circuit from an accidental reversal of battery polarity but also has the benefit of preventing a circuit's storage capacitor(s) from being discharged during battery dropouts or other common disturbances on the power supply. A disadvantage associated with the use of diodes, however, is the resultant drop in voltage (approximately 0.6V) which occurs across the diode. While this drop in voltage is insignificant in low current applications, it becomes problematic in high current applications where a large power drop across a diode can lead to overheating. This of course can be a significant issue in, for example, high temperature applications where the circuit semiconductors are already operating close to their maximum allowable junction temperatures.

Metal-oxide-semiconductor field-effect transistors (MOSFETs) have also been used in circuits for reverse battery protection. While the use of a MOSFET overcomes the issue of overheating, MOSFETs are not capable of providing any directional current flow control in the event of, for example, a very rapid discharge of a circuit's storage capacitors during, for example, dropouts or other disturbances to the power supply. In many high temperature applications, low voltage drop (and power dissipation) of the MOSFET coupled with the unidirectional flow control of the diode are both desired features.

The present invention is directed to a reverse battery circuit operable at high temperatures and tolerant of load dump pulses in excess of 200V.

SUMMARY OF THE INVENTION

The present invention is generally directed to a battery protection circuit for an actuator comprising a voltage supply, a first circuit section which is coupled to the battery voltage supply and includes at least a first transistor, and a second circuit section which is coupled to both the battery voltage supply and the first circuit section and includes at least a second transistor which is adapted to turn the first transistor off in the event of an interruption or reversal in the battery voltage supply.

In one embodiment, the battery protection circuit comprises a voltage supply; a first circuit section which includes a first circuit line coupled to the voltage supply, a first transistor on the first circuit line, a second circuit line, a first resistor which extends between the first and second circuit lines, and a first diode which extends between the first and second circuits; a second circuit section which includes a second transistor having a collector coupled to the second circuit line, a third circuit line which extends between the first circuit line and the base of the second transistor, a third circuit line which includes a second resistor, and a fourth circuit line which extends between the first circuit line and the emitter of the second transistor and includes a third resistor and a first capacitor coupled in series.

There are other advantages and features that will be more readily apparent from the following description of the invention, the drawings, and the appended exemplary claims.

BRIEF DESCRIPTION OF THE DRAWINGS

In the accompanying drawing that forms part of the specification:

FIG. 1 is a schematic diagram of the reverse battery circuit of the present invention.

DETAILED DESCRIPTION OF THE EMBODIMENT

While this invention is susceptible to embodiment in many different forms, this specification and the accompanying FIG. 1 disclose only one form of the subject reverse battery circuit as an example of the invention. The invention is not intended to be limited to the embodiment so described, however. The scope of the invention is identified in the appended claims.

FIG. 1 depicts one embodiment of a battery protection circuit 20 in accordance with the present invention which is adapted for use in any high current device which must sustain dropouts and operate in high temperatures under larger transients such as, for example, high torque, high temperature products such as vehicle actuators.

Initially, the circuit 20 comprises a pair of voltage terminals, namely, a battery voltage input or supply (Vbatt) terminal 22 and a reverse battery voltage input or supply (Vrevb) terminal 24. A circuit line 26 couples and connects the Vbatt and Vrevb supply terminals 22 and 24 to each other.

The circuit 20 additionally comprises a plurality of spaced-apart, parallel circuit lines 28, 30, 32, 34, and 36 which are coupled to the circuit line 26 and three additional circuit lines 38, 40, and 41 as described in more detail below.

Circuit line 28 is coupled at one end to the circuit line 26 at node 42 and is coupled at the other end thereof to the base of a transistor Q2 which, in the embodiment shown, is a P-channel bipolar (BJT) transistor. Node 42 is located on the circuit line 26 adjacent the Vbatt terminal 22. The circuit line 28 additionally includes a resistor R2 located thereon between the node 42 and the base of the transistor Q2.

A transistor Q1 which, in the embodiment shown, is a P-channel metal-oxide-semiconductor field-effect transistor (MOSFET), is located on the circuit line 26. The circuit line 30 extends between the gate of the transistor Q1 at one end and ground at the other end. A resistor R3 is located on the circuit line 30 between the gate of the transistor Q1 and ground.

Circuit line 38 is coupled at one end to the circuit line 30 at a node 44. The node 44 is located on the circuit line 30 between the gate of the transistor Q1 and the resistor R3. The other end of the circuit line 38 is coupled to the collector of the transistor Q2. In the embodiment shown, the circuit lines 26 and 38 are disposed in a spaced-apart and parallel relationship relative to the circuit line 26 and the circuit lines 30, 32, 34, and 36 extend generally normally between the circuit line 26 and the circuit line 38.

Circuit line 32 includes a resistor R1 and extends between a node 46 on the circuit line 26 and a node 43 on the circuit line 38. The node 43 is located on the circuit line 38 between the node 44 and the collector of the transistor Q2.

Circuit line 34 includes a Zener diode D1 and extends between a node 50 on the circuit line 26 and a node 52 on the circuit line 38. The anode of the diode D1 is coupled to the circuit line 38 and the cathode of the diode D1 is coupled to the circuit line 26. The circuit line 32 is located between the circuit lines 30 and 34. Node 52 is located on the circuit line 38 between the node 43 and the collector of the transistor Q2. The node 43 is located on the circuit line 38 between the nodes 44 and 52. The node 46 is located on the circuit line 26 between the source of the transistor Q1 and the node 50.

Circuit line 36 includes a resistor R4 and a capacitor C1 coupled in series. One end of the circuit line 36 is coupled to the circuit line 26 at a node 54. The other end of the circuit line 36 is coupled to ground. Node 54 is located on the circuit line 26 between the Vrevb terminal 24 and the node 50.

Circuit line 40 extends between a node 56 on the circuit line 36 and the emitter of the transistor Q2. The node 56 is located on the circuit line 36 between the resistor R4 and the capacitor C1.

The circuit line 41 extends between a node 57 on the circuit line 28 at one end and ground at the other end. The node 57 is located on the circuit line 28 between the resistor R2 and the base of the transistor Q2. A diode D2 is located on the circuit line 41 between the node 57 and ground. The cathode of the diode D2 is coupled to the circuit line 28 and the anode of the diode D2 is coupled to ground.

A description of the operation of the reverse battery protection circuit 20 of the present invention follows:

The circuit elements Q1, R1, R3, and D1 together with the associated circuit lines 26, 30, 32, 34, and 38 are located between and coupled to the (Vbatt) and (Vrevb) voltage supply terminals 22 and 24 on the circuit line 26 and in combination form and define a first standard MOSFET-based reverse battery protection section 100 of the circuit 20.

Circuit 20 is supplied with a voltage and power through the battery voltage (Vbatt) terminal 22 which is connected to a power bus (not shown).

When a positive voltage is applied through the (Vbatt) terminal 22 and the circuit line 26, current flows through the parasitic body diode of the transistor Q1 (internal, not shown), and then through the resistors R1 and R3 on the respective circuit lines 32 and 30 which causes a voltage across the gate/cathode of the diode D1 which turns the diode D1 ON and powers all of the circuitry supplied by Vrevb. Zener diode D1 is a protection diode that prevents the gate voltage on the transistor Q1 from exceeding its maximum allowable voltage. If a negative voltage is applied to the Vbatt terminal 22, the transistor Q1 is never turned ON or is turned OFF before the voltage turns negative to isolate the circuitry supplied by Vrevb and protect the same from damage from negative voltage. The diode D2 keeps the base of the transistor Q2 from turning negative and thus prevents parasitic leakage from turning the transistor Q1 ON.

The circuit elements Q2, C1, R2, R4, and D2 together with the associated circuit lines 28, 36, 40, and 41 define a second voltage cut-off section 200 of the circuit 20 which is coupled to both the voltage supply terminals 22 and 24 and the first section 100 of the circuit 20. More specifically, and as shown in FIG. 1, the transistor Q2 includes a collector which is coupled to the circuit line 38 of the first circuit section 100, a base which is coupled to the circuit line 26 via the circuit line 28 of the second circuit section 200, and an emitter which is coupled to the circuit line 26 via the circuit line 36 of the second circuit section 200.

Under normal operation (i.e., constant battery supply voltage), the transistor Q2 remains OFF because the voltage on the base of the transistor Q2 is greater than the voltage on the emitter of the transistor Q2, causing the transistor Q2 to remain OFF. Resistor R4 and capacitor C1 in the second section 200 of the circuit 20 define a third voltage storage section of the circuit 20 that charges up after the transistor Q1 is activated and maintains a voltage on the emitter of the transistor Q2 during any interruption in the battery voltage Vbatt supply for a period of time sufficient to allow the transistor Q2 to turn the transistor Q1 OFF.

In the case of a voltage interruption at Vbatt terminal 22, the emitter of the transistor Q2 is held high by the capacitor C1 while current flows through the base of the transistor Q2 via the resistor R2. This turns the transistor Q2 ON and quickly turns the transistor Q1 OFF to prevent current from flowing backwards from Vrevb to Vbatt through the transistor Q1. When the disturbance ends and the voltage on the base of the transistor Q2 returns to being greater than the voltage on the emitter of the transistor Q2, the transistor Q2 turns OFF and the transistor Q1 is allowed to turn ON once again.

Numerous variations and modifications of the circuit embodiment described above may be effected without departing from the spirit and scope of the novel features of the invention. It is to be understood that no limitations with respect to the specific circuit illustrated herein are intended or should be inferred. It is, of course, intended to cover by the appended claims all such modifications as fall within the scope of the claims.

What is claimed is:

1. A battery protection circuit comprising:
    a voltage supply;
    a first circuit section coupled to the voltage supply and including at least a first transistor; and
    a second circuit section coupled to both the voltage supply and the first circuit section and including at least a capacitor and a second transistor coupled to the capacitor and adapted to turn the first transistor off in the event of an interruption in the voltage supply, the first transistor being located on a first circuit line and the second circuit section further comprising a resistor located on a second circuit line in series with the capacitor, the second transistor including an emitter coupled to the second circuit line at a point on the second circuit line between the capacitor and the resistor.

2. A battery protection circuit comprising:
    a voltage supply;
    a first circuit section including:
        a first circuit line coupled to the voltage supply;
        a first transistor on the first circuit line;
        a second circuit line;
        a first resistor extending between the first and second circuit lines;
        a first diode extending between the first and second circuit lines; and
    a second circuit section including:

a second transistor including an emitter and a collector coupled to the second circuit line;

a third circuit line extending between the first circuit line and the base of the second transistor, the third circuit line including a second resistor; and a fourth circuit line extending between the first circuit line and a ground terminal, the fourth circuit line including a third resistor and a first capacitor coupled in series, the emitter of the second transistor being coupled to the fourth circuit line at a point between the third resistor and the first capacitor and the first capacitor being adapted to hold the emitter of the second transistor high to turn the second transistor on and the first transistor off in the event of an interruption in the voltage supply.

\* \* \* \* \*